Aug. 12, 1958    R. A. A. JEANNIN    2,847,494
BATTERY OF DEFERRED ACTION CELLS
Filed March 8, 1956    2 Sheets-Sheet 1
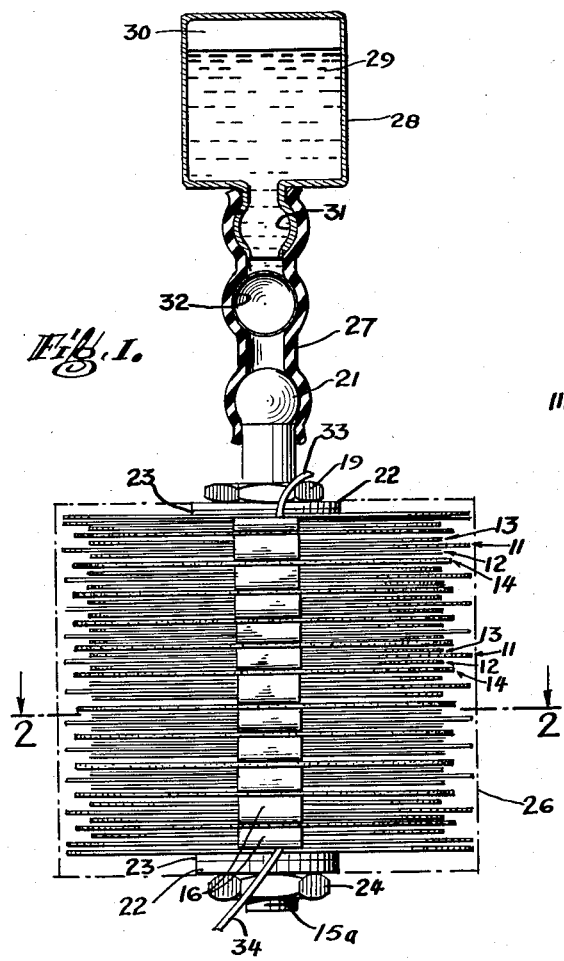
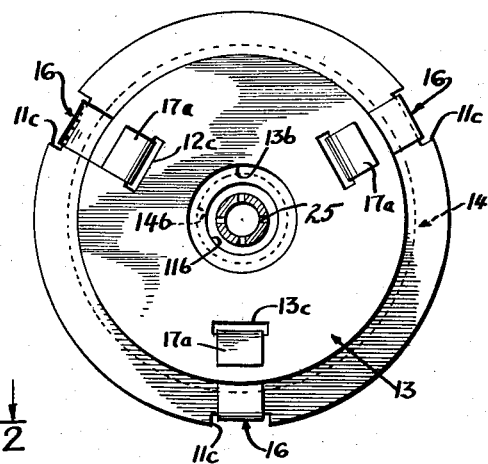
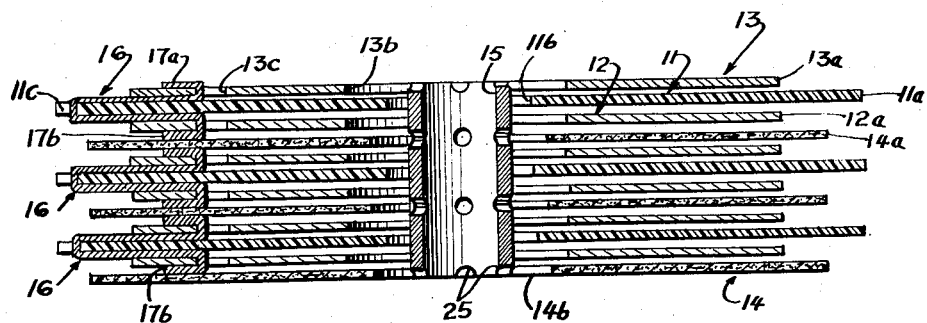
INVENTOR
ROBERT A. A. JEANNIN
BY
ATTORNEYS

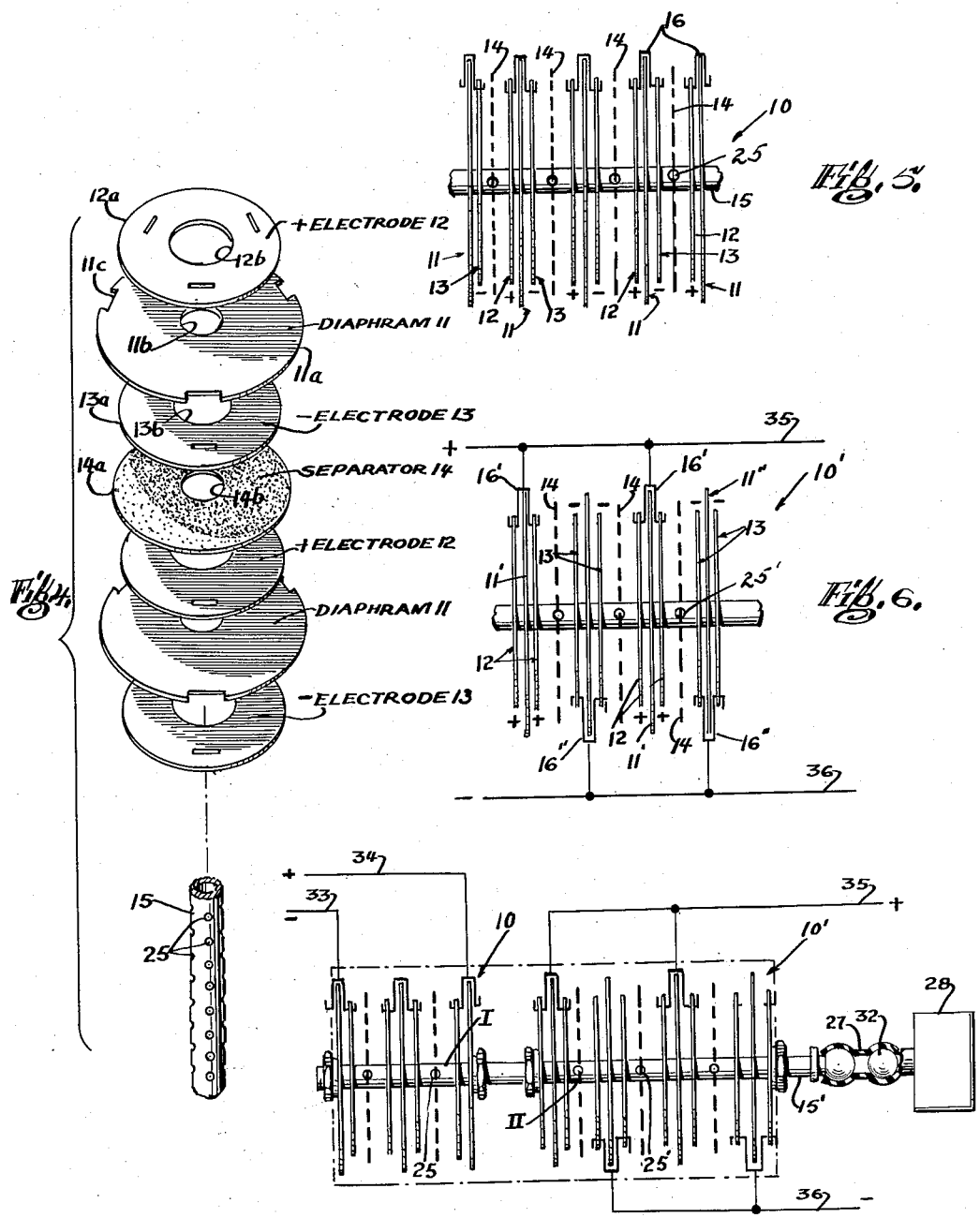

United States Patent Office 2,847,494
Patented Aug. 12, 1958

2,847,494

BATTERY OF DEFERRED ACTION CELLS

Robert A. A. Jeannin, Paris, France, assignor to Societe des Accumulateurs Fixes et de Traction (Societe Anonyme), Romainville, France, a company of France Application March 8, 1956, Serial No. 570,253

Claims priority, application France October 10, 1955

9 Claims. (Cl. 136—90)

This invention relates to deferred action cells and batteries in which the electrolyte required for activation is intended to be brought into contact with the electrodes at the moments of use of the batteries.

Batteries of this type have a long shelf life. While some such types of batteries are known in the art, the use of a plurality of deferred action cells in the same apparatus has heretofore not been without difficulties especially when said cells were series connected. It has been found practically impossible heretofore when each cell was provided with its own impervious casing to effect contact simultaneously in all the cells of electrolyte and electrodes, especially in cases where each cell had its own store of electrolyte.

This simultaneous contact is essential, for example, where a number of series-connected cells are required in certain forms of electronic apparatus, all of which must be activated simultaneously at a precise moment to obtain a high polarization voltage. Earlier forms of deferred action cells referred to could not be used satisfactorily for such purposes.

Objects and features of the present invention are the provision of a deferred action battery whose construction is such that electrolyte from a common source for all its cells can be brought into contact with the pairs of electrodes of each cell of the battery at substantially the same moment for every cell.

According to the invention, the battery of voltaic cells includes a pile of thin apertured sheets comprising sheets having the characteristics of positive electrodes, sheets having the characteristics of negative electrodes, interposed separator sheets, and isolator diaphragm sheets between cells, said separator sheets and porous ones of the electrode sheets being able to absorb and retain electrolyte, and the corresponding apertures or perforations of the piled-up sheets being traversed by a perforated tube via which it is possible when activation is desired to introduce a limited amount of electrolyte under pressure for simultaneous distribution to all of the separator and electrode sheets of the cells forming the battery or batteries.

Owing to the perforations in the tube and the canal defined adjacent the tube by the aligned apertures of the piled sheets, the electrolyte pours into the canal and soaks all the separator and electrode sheets substantially simultaneously, thus activating all of the cells at the same time. Preferably, the quantity of electrolyte introduced is just sufficient to insure impregnation and absorption of electrolyte by each element of the cells without excess. As a result there is no free electrolyte to form bridges between elements of various cells either along the outer peripheral edges of the sheets or along the inner edges of their apertures.

To prevent leakage of the electrolyte from the battery and around the sheets, the pile of sheets preferably is compressed highly on the perforated central tube as a support by threaded nuts engaged on threaded portions at opposite ends of the tube. The said tube is provided with perforations along its length between its threaded ends, one of the said ends being closed and the other open for introduction of electrolyte.

In this way the electrolyte forced into the tube flows only into the canal defined between the tube and the inner peripheries of the apertures via the tube perforations as the pressure exerted by the threaded nuts on the pile prevents leakage of electrolyte around the electrode and isolating sheets so that it is forced into the absorbing separator and electrode sheets.

A particular advantage offered in this arrangement, in addition to those previously mentioned, is that the battery can be mounted in any position suitable for its use. In addition, a very compact strongly assembled unit results which is capable of resisting high accelerations (several times the acceleration of gravitation).

In an advantageous embodiment of the invention each cell comprises a positive electrode sheet, a negative electrode sheet and an interposed separator sheet, the said cell being separated from an adjoining cell by an isolating diaphragm. The said diaphragm has a larger area than that of the said sheets so that it overlaps both the outer edges and the inner edges of these sheets. The diaphragm also serves as a support for a pair of electrode sheets disposed on its opposite faces. The said inner edges border or define the canal through which electrolyte is introduced into the cells.

The separator sheet preferably has an area intermediate that of the like areas of the positive and negative electrode sheets and of the area of the diaphragm. In addition, it is preferable that the two electrode sheets located on opposite sides of the same diaphragm be connected together by at least one conductive bridge which passes around the outer edge of the diaphragm. In an advantageous embodiment of this invention the conductive bridge is constructed from a flat strip of conductive metal folded into substantially U or hairpin like shape with the bend straddling the outer edge of the diaphragm in notches thereof. The said strip in addition has its ends folded back in hookwise manner, the resulting hooks being threaded through slots provided in the electrode sheets that are to be supported by the diaphragm.

The electrode sheets may be of different kinds of material depending upon the electrochemical couple that is used. For example, this couple may be nickel sesquioxide for the positive electrode sheets and zinc for the negative electrode sheets when the electrolyte is potassium hydroxide, or cuprous chloride for the positive sheets and magnesium for the negative sheets when the electrolyte is sodium chloride; or carbon for the positive sheets and zinc for the negative sheets when the electrolyte is chromic acid.

Preferably, the separator sheets are made of textile fibers which are able to absorb the electrolyte and retain it. These fibers may be employed in the form of fabrics or felts. Non-woven fabrics are advantageously used, i. e., fabrics formed by substantially parallel fibers bonded by transverse strips of adhesive material. The textile fibers, are preferably made of natural cellulose (cotton) or regenerated cellulose. In the case of non-woven fabrics the bonding agent may be viscose cellulose.

When the battery embodying the invention is used as part of a portable device, the fixed amount of electrolyte which is to be introduced into the battery via the perforated tube may be provided in a rubber bulb or in a syringe which can be appropriately connected to the perforated tube at the time it is desired to activate the battery.

When the device including the battery is self-contained and the fixed amount of electrolyte must be automatically introduced into the perforated tube, a container for the electrolyte under pressure may be permanently connected with the perforated tube in conjunction with a sealing arrangement that may be opened in any appropriate way when the battery is to be activated.

Other objects and features of the invention are the provision of batteries of the type described whose cells are either in series connection, in parallel connection, or in combinations of such connections.

Yet other objects and features of the invention are the provision of simple effective structure for providing the rugged batteries contemplated by this invention.

Further objects and features of the invention are the provision of structure that is simple and readily assembled at comparatively low cost.

Additional objects and features of the invention will become apparent from the following specifications and the accompanying drawings which are intended as a nonlimiting illustration and wherein:

Figure 1 is a sectional elevation of a battery of cells constructed in accord with the invention, the said battery being provided with a container for electrolyte under pressure;

Figure 2 is a sectional view taken along line 2—2 of Fig. 1;

Figure 3 is an enlarged fragmentary part of the sectional elevation of Fig. 1;

Figure 4 is an exploded view of component sheets of a battery and of a traversing perforated tube intended to illustrate details of the construction; and Figures 5, 6 and 7 illustrate diagrammatically three different ways of electrically connecting the cells in batteries made in accord with this invention.

Referring to the drawings and first to Figs. 1 to 4, inclusive, the reference character 10 denotes a battery of voltaic cells embodying the invention and arranged in a superposed pile. The pile comprises thin centrally apertured disk-like sheets 11, 12, 13, 14 disposed in the pile in the order shown and mounted on a perforated tube 15 to be described in detail hereinafter. Disk 12 is a positive electrode sheet. Disk 11 is a diaphragm sheet. Disk 13 is a negative electrode sheet. Disk 14 is a separator sheet.

The sheet diaphragm disks 11 which are intended to separate two adjoining cells in the battery are preferably made of electrolyte impervious material, for example, polyvinyl chloride impregnated with silicon insulating compound of conventional type. Other materials providing like characteristics may be used. With relationship to the other disks 12, 13 and 14 the diameter of the diaphragm disks 11 at their outer peripheries 11a is greatest, while the diameters of their central apertures 11b are the smallest. These disks 11 are provided along their outer peripheries with notches or recesses 11c. Preferably three such notches are provided in each disk 11 and they are symmetrically spaced 120° apart.

The sheet disks 12 serving as the positive cell electrodes are disposed respectively on one side of a diaphragm disk 11. With relationship to the disks 11 and 14 the outer edges 12a of positive electrode disks 12 have the smallest diameters while their central apertures 12b have the largest diameter. Each of the disks 12 include slots 12c which correspond substantially in size and in angular disposition with the notches 11c of the diaphragm disks 11. These disks 12 as the positive electrodes are made of the appropriate positive electrode materials hereinbefore mentioned.

The sheet disks 13 serving as negative electrodes have diametrical dimensions which are identical with those of the positive electrodes 12. These disks 13 include the central apertures 13b and the slots 13c disposed in similar manner to the apertures 12b and slots 12c of the positive electrodes 12. These disks 13 are composed of appropriate negative electrode materials mentioned. These disks 13 are positioned respectively on the opposite sides of the respective diaphragm disks 11 from the sides thereof bearing the positive electrode disks 12. Each positive and negative electrode 12 and 13 located on opposite sides of a diaphragm disk 11 is maintained in concentric united relationship therewith by the U-shaped strips of conductive metal 16 with their reversely bent hook-like ends, 17a and 17b. The strips 16 are passed around the recesses 11c of the diaphragm 11 and their hook-like ends 17a and 17b respectively are threaded through the slots 12c and 13c of the respective electrode disks 12 and 13. With such arrangement the positive and negative pairs of disks 12 and 13 are supported in centralized relationship from opposite sides of the diaphragms 11. After mounting of the disks 12 and 13 in this manner the hook-like ends 17a and 17b are flattened against the respective electrodes under pressure to provide permanent attachment and good electrical connection between electrodes 12 and 13 on opposite sides of the insulating disk or diaphragm 11. In some cases, for reasons to be described, some diaphragm disks have positive electrode disks 12 mounted on both faces and other diaphragm disks have negative electrode disks 13 mounted on both faces.

The separator disks 14 are used to provide electrolyte between facing electrodes carried by a pair of adjacent diaphragm disks 11. These separator disks 14 have a diameter at their outer peripheries 14a which is intermediate that of the diameters of the diaphragms 11 and the outer diameters of the electrode disks 12 and 13. Likewise, the diameter of the central aperture 14b of the separator disks 14 is intermediate that between the diameters of the central apertures 11b and 12b and 13b. These separator disks 14 are composed of the fibrous materials hereinabove mentioned.

The supporting metallic elements 16 which serve to mount the electrode disks 12 and 13 from a diaphragm disk 11 are made, for example, of nickel plated steel. Other suitable conductive metallic material may be used. Each of these strips 16 is folded with a U-bend or hairpinwise so that its bend may be mounted astride the outer edge 11a of the diaphragm 11 in notches 11c thereof. The ends of these strips are folded back upon themselves to provide hooks 17a and 17b which, respectively, can be threaded through the slots 12c and 13c in the electrode disks 12 and 13. After mounting of these strips in the diaphragm notches and the threading of their hooked ends into the corresponding slots these hooks are flattened out, for example, by a press. The resulting set of three disks 11, 12 and 13 secured by the strips 16 provide a rigid unit in which the metallic strips 16 serve as conductive bridges between the two electrodes located at opposite sides of diaphragm 11. Sets of these assembled disks 11, 12 and 13 with separator disks 14 between are piled on the perforated tube 15 so that the facing disks 12 and 13 of adjacent sets have opposite polarity with a separator disk 14 interposed between them. Each such group consisting of a positive disk, a negative disk and a separator disk constituting a battery cell.

The perforated tube 15 is closed at one end and also externally threaded adjacent said end at 15a. A shoulder 19 is provided adjacent the other end of tube 15, and externally thereof the tube is prolonged to provide an open nipple 21 for purposes presently to be described. In assembling the battery washers 22 and gaskets 23 of rubber or the like are located externally of the two outermost electrode disks, and a clamping nut 24 is tightened on the threaded portion 15a of tube 15 to clamp the assembled disks tightly together with tube 15 in a centralized position, so that the aperture edges of said discs define a channel or canal with the outer tube surface. The tube perforations 25 are disposed in the length of said tube between the shoulder and the threaded portion 15 in the area defined by the canal. Preferably, at least one perforation 25 is provided for each cell in the assembly lying approximately opposite the separator disk 14 thereof. The distribution of perforations may be any other desirable one and more than one perforation 25 for each cell may be provided.

The assembled battery of cells may be enclosed in an overall protective casing or envelope 26 of any desirable type.

Such a battery may conveniently be activated whenever its use is desired by injecting a determined quantity of the requisite electrolyte into the perforated tube 15 via its nozzle 21. To this end, for example, a bulb or syringe (not shown) containing the electrolyte in determined and measured amount which is just sufficient to saturate all the separator disks 14 and all the electrode disks 12 and 13 of the battery without excess may be conveniently connected to the nozzle 21 as by a flexible tube 27 of rubber or the like for injection of the electrolyte under pressure into the tube 15 and the cells of the battery.

In the alternative, a container 28 is provided, bearing the requisite measured amount of electrolyte 29 which is maintained therein under pressure, for example, of compressed air in the space 30. The outlet 31 of this container 28 is connected to the inlet of the flexible tube 27. Egress of the electrolyte contents from container 28 is prevented, for example, by a frangible plug 32 in the tube 27. This plug 32 may be simply a thin glass ball that can be broken or crushed at will by finger pressure or in any other desirable way. When shattered the compressed gas in space 30 can express the electrolyte in container 28 into the tube 15 whence it is distributed substantially simultaneously to all the separators 14 and all the electrode disks 12 and 13 via perforations 25. Any other desirous valving arrangement may be provided either in the rubber tube 27 or outlet 31 or elsewhere for permitting release of the electrolyte from container 28 and its introduction into the battery.

In any event, introduction of the electrolyte 29 under pressure from the bulb, syringe or container into tube 15 results in its substantially simultaneous distribution via tube perforations 25 to the canal defined by the disk apertures and tube 15 and its absorption by all the separator disks 14 and all the electrode disks 12 and 13 at substantially the same time so that all the cells of the battery are activated at the same time. Since the quantity of electrolyte 29 injected is just sufficient to impregnate and saturate all the separator disks 14, no excess in the form of drops or the like is available to cause short circuits between adjacent cells at the inner or outer peripheries of the electrode and diaphragm disks. The fact that the diaphragm disks 11 are non-wettable by reason of their impregnation with silicones as hereinbefore described aids in preventing short circuits. The absorbing character of the separator disks 14 and all the electrode disks 12 and 13 makes them retain the electrolyte so that the battery 10 is operative in any position without change in its output characteristics.

When the diaphragm disks 11 carry electrodes of opposite polarity on their respective faces, and assembly of such sets, as seen in Fig. 5, is such that each negative electrode disk 13 faces a positive electrode disk 12 through a separator disk 14, the various cells of the battery 10 are series connected. It is then sufficient merely to connect leads 33 and 34, respectively, to the bridge members 16 on the two outermost diaphragm disks 11 which have opposite polarity to obtain a total battery voltage which is the sum of the individual cell voltages between said leads.

It is possible also, as shown in Fig. 6, in cases where some diaphragm disks 11′ are provided on both sides with positive electrode disks 12 and other diaphragm disks 11″ are provided on both sides with negative electrodes 13, to utilize groups of such electrode bearing disks 11′ and 11″ to provide a battery 10′ in which the cells are parallel-connected. In such event, the electrode bearing disks 11′ and 11″ are disposed in alternation in the pile with separator disks 14 between adjacent electrode disks 12 and 13 of opposite polarity. All the bridging members 16′ of positive polarity are connected to a common lead 35 and all the bridging members 16″ are connected to a common lead 36. The voltage then between the two leads 35 and 36 of the resulting battery 10′ is that of a single one of its cells while the capacity of the said battery is the sum of the capacities of its individual cells.

It will be understood that it is possible, too, to combine the structures and connections of Figs. 5 and 6 to obtain series-parallel connecting arrangements thus producing batteries of differently desired capacities and voltages.

In a further embodiment shown diagrammatically in Fig. 7, two batteries 10 and 10′ are disposed on a common tube 15′ which has structure similar to that of tube 15 being provided with spaced apart perforated portions I and II each bearing perforations 25′. The first battery 10 which constructed in the manner described and shown in Figs. 1–5, inclusive, is positioned over the perforated portion I of said tube 15′ while the second battery 10′ constructed and arranged as described and shown in Fig. 6 is positioned over the perforated portion II of said tube 15′. When electrolyte is delivered into tube 15′ in any of the ways hereinbefore described it is substantially simultaneously introduced via the perforation 25′ in the portions I and II thereof to both batteries 10 and 10′ so that both batteries 10 and 10′ and all cells of each are activated substantially at the same time. The series connected battery 10, for example, is useful to provide polarization voltages for electronic tubes (not shown), while the parallel-connected battery 10′ serves to provide heating current for said tubes. Thus, a single source of electrolyte may serve conveniently to activate both batteries 10 and 10′ substantially simultaneously and thereby insure proper electronic tube operation. More than two batteries may be mounted on a common perforated tube for simultaneous activation, if desired.

It is to be understood that changes and structural variations within the scope of the appended claims are possible and are contemplated. There is no intention, therefore, of limitation to the exact details shown and decribed.

What is claimed is:

1. A battery of the character described comprising a pile of apertured flat sheets whose apertures are aligned, said pile including sheets having positive electrode characteristics, sheets having negative electrode characteristics, separator sheets one between each pair of adjoining sheets of the first and second named characteristics for retaining electrolyte, and isolator sheets impervious to the electrolyte separating groups of sheets consisting respectively of a sheet having positive electrode characteristics, a sheet having negative electrode characteristics and an interposed separator sheet, a tube having a plurality of perforations in its length and traversing the aligned apertures of all sheets in the pile without making contact with any one of said sheets, said tube serving to permit introduction of electrolyte into the battery for substantially simultaneous distribution to all separator and electrode sheets therein and means for introducing a determined quantity of electrolyte into said tube for such distribution.

2. A battery of the character described comprising a pile of similarly shaped apertured sheets whose apertures are aligned, said pile including positive electrode sheets, negative electrode sheets, separator sheets for retaining electrolyte, and non-conductive diaphragm sheets, said sheets being disposed in the pile to provide individual cells each including a positive electrode sheet, a negative electrode sheet and a separator sheet therebetween and with adjacent cells separated by a non-conductive diaphragm sheet having larger outer peripheral dimensions and smaller aperture dimensions than those of said separator sheets and said electrode sheets, and a tube having a plurality of perforations in its length and traversing the aligned apertures of all the sheets in a substantially centralized position relative to the aperture and without making contact with any one of said sheets, said tube serving to permit introduction of electrolyte under pressure into the battery for substantially simultaneous distribution via the tube perforations to all separator and electrode sheets therein, and means for introducing a determined quantity of electrolyte into said tube for such distribution.

3. The battery of claim 2 including means for supporting an electrode sheet on each face of each diaphragm sheet, said means including conductive metallic bridging members straddling each diaphragm sheet and engaging an electrode sheet on each face thereof.

4. The battery of claim 2 including conductive metallic bridging members straddling each diaphragm sheet for supporting an electrode sheet on each diaphragm sheet face and for providing electric connection between such so supported electrode sheets.

5. The battery of claim 2 including means for supporting an electrode on each face of each diaphragm sheet, and wherein each diaphragm sheet is disposed in the pile so that it carries one of the two electrodes of adjoining pairs of cells.

6. A battery comprising a pile of apertured sheets whose apertures are aligned and including positive electrode sheets, negative electrode sheets, separator sheets, one separator sheet between each pair of positive and negative electrode sheets for retaining electrolyte, and isolator diaphragm sheets impervious to the electrolyte separating groups of sheets consisting respectively of a positive sheet, a negative sheet and an interposed separator sheet, a tube having a plurality of perforations and traversing the aligned apertures of all the sheets in a substantially centralized position relative to the apertures and without making contact with any one of said sheets, said tube serving to permit introduction of electrolyte into the battery for substantially simultaneous distribution to all separator and electrode sheets, container means for a determined amount of electrolyte and means for connecting said container to said tube for delivering its determined amount of electrolyte thereto for such distribution.

7. The battery of claim 6 wherein said electrolyte is maintained under pressure within said container and wherein said connecting means is attached permanently to said tube and includes releasable sealing means for permitting ready transmission of the electrolyte contents of the container to the tube.

8. A battery of the character described comprising a casing, a plurality of cell groups all within said casing and consisting of a pile of apertured sheets of similar shape whose apertures are aligned and including in said pile sheets having positive electrode characteristics, sheets having negative electrode characteristics and interposed separator sheets between respective adjoining sheets having positive and negative electrode characteristics, and isolator diaphragm sheets between each cell group of the battery defined by a sheet having positive electrode characteristics, a sheet having negative electrode characteristics and an interposed separator sheet, said isolator diaphragm sheets having largest outer peripheral dimensions of all the sheets and smallest aperture dimensions thereof, said sheets having positive electrode characteristics and said sheets having negative electrode characteristics having smallest outer peripheral dimensions and largest aperture dimensions of all the sheets, and said separator sheets having outer peripheral dimensions and aperture dimensions intermediate those of the isolator diaphragm sheets and those of the sheets having positive and negative electrode characteristics, a tube having perforations in its length traversing the aligned apertures of all the sheets without contact with any of the sheets, said tube serving to permit introduction of electrolyte into the battery for substantially simultaneous distribution to all separator and electrode sheets therein, and means for introducing a determined quantity of electrolyte into said tube for such distribution.

9. A battery of the character described comprising a casing, a plurality of cell groups all within said casing and consisting of a pile of apertured sheets of similar shape whose apertures are aligned and including in said pile sheets having positive electrode characteristics, sheets having negative electrode characteristics and interposed separator sheets between respective adjoining sheets having positive and negative electrode characteristics, and isolator diaphragm sheets between each cell group of the battery defined by a sheet having positive electrode characteristics, a sheet having negative electrode characteristics and an interposed separator sheet, said isolator diaphragm sheets having largest outer peripheral dimensions of all the sheets and smallest aperture dimensions thereof, said sheets having positive electrode characteristics and said sheets having negative electrode characteristics having smallest outer peripheral dimensions and largest aperture dimensions of all the sheets, and said separator sheets having outer peripheral dimensions and aperture dimensions intermediate those of the isolator diaphragm sheets and those of the sheets having positive and negative electrode characteristics, a tube having perforations in its length traversing the aligned apertures of all the sheets without contact with any of the sheets, said tube serving to permit introduction of electrolyte into the battery for substantially simultaneous distribution to all separator and electrode sheets therein, a container for a determined amount of electrolyte under pressure, a conduit connecting said container to said tube and a frangible closure member in said conduit which must be broken to permit pressure delivery of said electrolyte from said container of said tube via said conduit.

References Cited in the file of this patent

UNITED STATES PATENTS

| | | |
|---|---|---|
| 778,912 | Stockigt | Jan. 3, 1905 |
| 1,015,317 | Humel | Jan. 23, 1912 |
| 1,334,849 | Fraley | Mar. 23, 1920 |
| 1,481,178 | Benner et al. | Jan. 15, 1924 |
| 1,644,017 | Hendry | Oct. 4, 1927 |
| 2,491,640 | Blake et al. | Dec. 20, 1949 |
| 2,615,931 | Hatfield | Oct. 28, 1952 |

FOREIGN PATENTS

| | | |
|---|---|---|
| 1,093,523 | France | Nov. 24, 1954 |